(12) United States Patent
Grams

(10) Patent No.: US 8,339,641 B2
(45) Date of Patent: Dec. 25, 2012

(54) SYSTEMS AND METHODS FOR PROCESSING PACKAGED PRINT DATA STREAMS

(75) Inventor: Jason Grams, Broomfield, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 1031 days.

(21) Appl. No.: 12/346,762

(22) Filed: Dec. 30, 2008

(65) Prior Publication Data

US 2010/0165380 A1 Jul. 1, 2010

(51) Int. Cl.
*G06F 3/12* (2006.01)
(52) U.S. Cl. .......................... 358/1.15; 358/1.1; 715/200
(58) Field of Classification Search ................... 358/1.1, 358/1.9, 3.23, 1.13, 1.15; 715/200, 204, 715/209, 234, 276, 277
See application file for complete search history.

(56) References Cited

U.S. PATENT DOCUMENTS

| | | | |
|---|---|---|---|
| 7,366,982 B2 * | 4/2008 | Shur et al. .................... | 715/234 |
| 7,418,652 B2 * | 8/2008 | Ornstein et al. ............... | 715/200 |
| 7,617,451 B2 * | 11/2009 | Jones et al. .................... | 715/272 |
| 8,125,660 B2 * | 2/2012 | Grams .......................... | 358/1.13 |
| 2005/0063010 A1 * | 3/2005 | Giannetti ...................... | 358/1.18 |
| 2005/0125724 A1 * | 6/2005 | Peiro et al. .................... | 715/517 |

* cited by examiner

*Primary Examiner* — Thomas D Lee
(74) *Attorney, Agent, or Firm* — Finnegan, Henderson, Farabow, Garrett & Dunner, L.L.P.

(57) ABSTRACT

Systems and methods consistent with embodiments presented facilitate packaged print data processing. In some embodiments, an initial fragment of print data is parsed to determine if the print data occurs in the form of an OPC print package. If the print data is an OPC package, a language processor for a PDL is invoked using a language entry point function for the PDL, which can be determined using a text string that is present in the print job filename and in a Content Types list in a Content Types file associated with the OPC package. If the PDL language processor cannot be determined using the Content Types list then a language entry point may be determined using a file extension associated with the print job.

21 Claims, 8 Drawing Sheets

Example XPS [Content Types] file:

```
<Types>
  <Default Extension="fdseq" ContentType="application/vnd.ms-package.xps-fixeddocumentsequence+xml"/>
  <Default Extension="rels" ContentType="application/vnd.openxmlformats-package.relationships+xml"/>
  <Default Extension="fdoc" ContentType="application/vnd.ms-package.xps-fixeddocument+xml"/>
  <Default Extension="fpage" ContentType="application/vnd.ms-package.xps-fixedpage+xml"/>
  <Default Extension="ttf" ContentType="application/vnd.ms-opentype"/>
</Types>
```

Example OOXML [Content Types] file:

```
<Types>
  <Default Extension="png" ContentType="image/png"/>
  <Default Extension="rels" ContentType="application/vnd.openxmlformats-package.relationships+xml"/>
  <Default Extension="xml" ContentType="application/xml"/>
  <Override PartName="/word/document.xml" ContentType="application/vnd.openxmlformats-officedocument.wordprocessingml.document.main+xml"/>
  <Override PartName="/word/styles.xml" ContentType="application/vnd.openxmlformats-officedocument.wordprocessingml.styles+xml"/>
  <Override PartName="/docProps/app.xml" ContentType="application/vnd.openxmlformats-officedocument.extended-properties+xml"/>
  <Override PartName="/word/settings.xml" ContentType="application/vnd.openxmlformats-officedocument.wordprocessingml.settings+xml"/>
  <Override PartName="/word/theme/theme1.xml" ContentType="application/vnd.openxmlformats-officedocument.theme+xml"/>
  <Override PartName="/word/fontTable.xml" ContentType="application/vnd.openxmlformats-officedocument.wordprocessingml.fontTable+xml"/>
  <Override PartName="/word/webSettings.xml" ContentType="application/vnd.openxmlformats-officedocument.wordprocessingml.webSettings+xml"/>
  <Override PartName="/docProps/core.xml" ContentType="application/vnd.openxmlformats-package.core-properties+xml"/>
</Types>
```

FIG. 5

| Text String | Language Enumeration |
|---|---|
| "officedocument" | LANGUAGE_OOXML |
| "wordprocessingml" | LANGUAGE_OOXML |
| "spreadsheetml" | LANGUAGE_OOXML |
| "presentationml" | LANGUAGE_OOXML |
| "xps" | LANGUAGE_XPS |
| "fixedDocument", "fixed document" | LANGUAGE_XPS |
| "fixedPage", "fixed page" | LANGUAGE_XPS |

| Language Enumeration | Language Entry Point Function |
|---|---|
| LANGUAGE_XML | _XMLEntry |
| LANGUAGE_XPS | _XPSEntry |
| OPC_TIFF | _TIFFEntry |
| OPC_JPEG | _JPEGEntry |

SYSTEMS AND METHODS FOR PROCESSING PACKAGED PRINT DATA STREAMS

BACKGROUND

1. Technical Field

The present disclosure relates to the field of printing and in particular, to systems and methods for processing packaged print data streams.

2. Description of Related Art

Document processing software allows users to view, edit, process, and store documents conveniently. Print content, which may include one or more documents with image and graphical data, may be represented and stored using a variety of formats. For example, in the Open Packaging Convention ("OPC") a combination of Extensible Markup Language ("XML") and non-XML files may be combined into a single container. The OPC convention outlines a mechanism for the specification of independent file entities that are embedded in a document without affecting the embedded files themselves and without a significant increase to the size of the document.

OPC, the XML Paper Specification ("XPS"), and other conventions can allow data of various formats to be stored in a single package, which can be in the "ZIP" format. ZIP is a well-known archive format that compresses every file in the package separately thereby allowing compressed distinct files to be individually retrieved and offering the potential for better compression because different algorithms may be used for different files in the package. Metadata and other information included in the package allow the data of various formats to be identified and may also indicate relationships between files contained in the package.

Although the information within a package may allow identification of package components, no information explicitly identifying the document format of the package itself is provided. Package file structure may be specified by the convention being used. Therefore, package file structure can be identical across document formats based on the same (or similar) conventions and a quick determination of package format by analyzing package file structure may be difficult. Because quick determination of the package format facilitates the package processing, there is a need for systems and methods for processing packaged print data streams that facilitate differentiating between packages using similar package structures.

SUMMARY

Consistent with disclosures herein, systems and methods for processing print data in a print job are presented. In some embodiments, the method comprises the computer-implemented steps of parsing at least one fragment of the print data to determine if the print data occurs in the form a of print package in a ZIP format; invoking a first PDL language processor for a first PDL using a language entry point function for the first PDL, wherein the language entry point function is determined using a text string that occurs in the print job filename and a Content Types list, if the print data is packaged in a ZIP format and if the unzipped fragment comprises a Content Types file that includes the Content Types list; and invoking a second PDL language processor for a second PDL at a language entry point for the second PDL, wherein the language entry point is determined using a file extension associated with the print job filename, if the print data is packaged in ZIP format and the first PDL language processor cannot be determined using the Content Types list in the unzipped fragment.

Embodiments also relate to methods for processing page layout instructions using a PDL. These and other embodiments are further explained below with respect to the following figures.

BRIEF DESCRIPTION OF THE DRAWINGS

FIG. 5 shows two exemplary Content Types files for XPS and OOXML.

FIG. 6 shows a table that correlates text strings in the Content Types list with PDLs.

FIG. 7 shows a table that correlates language enumerations with PDL language entry point functions.

DETAILED DESCRIPTION

Consistent with disclosed embodiments, systems and methods for systems and methods for processing packaged print data streams are presented.

Figure 1:
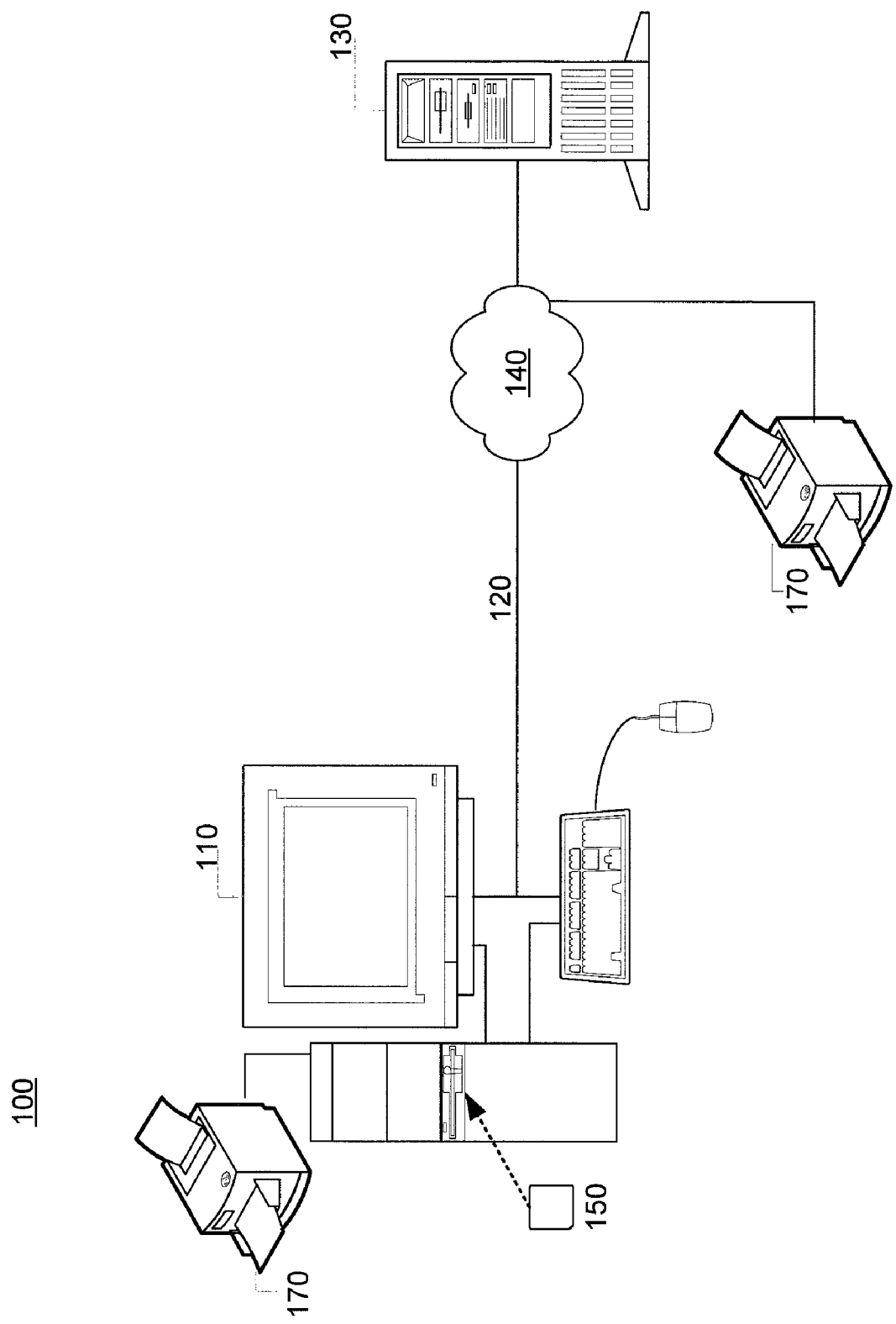
FIG. 1 shows a block diagram illustrating components in a system for printing documents.

FIG. 1 shows a block diagram illustrating components in a system for printing documents. A computer software application consistent with embodiments disclosed herein may be deployed on a network of computers, as shown in FIG. 1, that are connected through communication links that allow information to be exchanged using conventional communication protocols and/or data port interfaces.

As shown in FIG. 1, exemplary system 100 includes computers including a computing device 110 and a server 130. Further, computing device 110 and server 130 may communicate over a connection 120, which may pass through network 140, which in one case could be the Internet. Computing device 110 may be a computer workstation, desktop computer, laptop computer, or any other computing device capable of being used in a networked environment. Server 130 may be a platform capable of connecting to computing device 110 and other devices (not shown). Computing device 110 and server 130 may be capable of executing software (not shown) that allows the printing of documents using printers 170.

Exemplary printer 170 includes devices that produce physical documents from electronic data including, but not limited to, laser printers, ink-jet printers, and LED printers. Functionally, printer 170 may take the form of a plotter, facsimile machine, a digital copier, or a multi-function device. In some embodiments, printer 170 may also be capable of directly printing documents received from computing device 110 or server 130 over connection 120. In some embodiments such an arrangement may allow for the direct printing of documents, with (or without) additional processing by computing device 110 or server 130. In some embodiments, printer 170 may receive packaged print data streams for printing. Note, too, that print processing can be distributed. Thus, computing device 110, server 130, and/or printer 170 may perform portions of print processing such as analyzing packaged print data streams, half-toning, color matching, and/or other manipulation processes before a document is physically printed by printer 170.

Computing device 110 also contains removable media drive 150. Removable media drive 150 may include, for example, 3.5 inch floppy drives, CD-ROM drives, DVD ROM drives, CD±RW or DVD±RW drives, USB flash drives, and/or any other removable media drives consistent with disclosed embodiments.

Connection 120 couples computing device 110, server 130, and printer 170 and may be implemented as a wired or wireless connection using conventional communication protocols and/or data port interfaces. In general, connection 120 can be any communication channel that allows transmission of data between the devices. In one embodiment, for example, the devices may be provided with conventional data ports, such as parallel ports, serial ports, Ethernet™, USB, SCSI, FIREWIRE™, and/or coaxial cable ports for transmission of data through the appropriate connection. The communication links could be wireless links or wired links or any combination consistent with disclosed embodiments that allows communication between the various devices.

Network 140 could include a Local Area Network (LAN), a Wide Area Network (WAN), or the Internet. Printer 170 may be connected to network 140 through connection 120. In some embodiments, printer 170 may also be connected directly to computing device 110 and/or server 130. System 100 may also include other peripheral devices (not shown). A computer software application may be deployed on any of the exemplary computers and printers, as shown in FIG. 1. For example, computing device 110 could execute software that may be downloaded directly from server 130. In some embodiments, portions of a software application may reside on removable media and be read and executed by computing device 110 using removable media drive 150. Portions of the application may also be executed by printer 170 in accordance with some disclosed embodiments.

Figure 2:
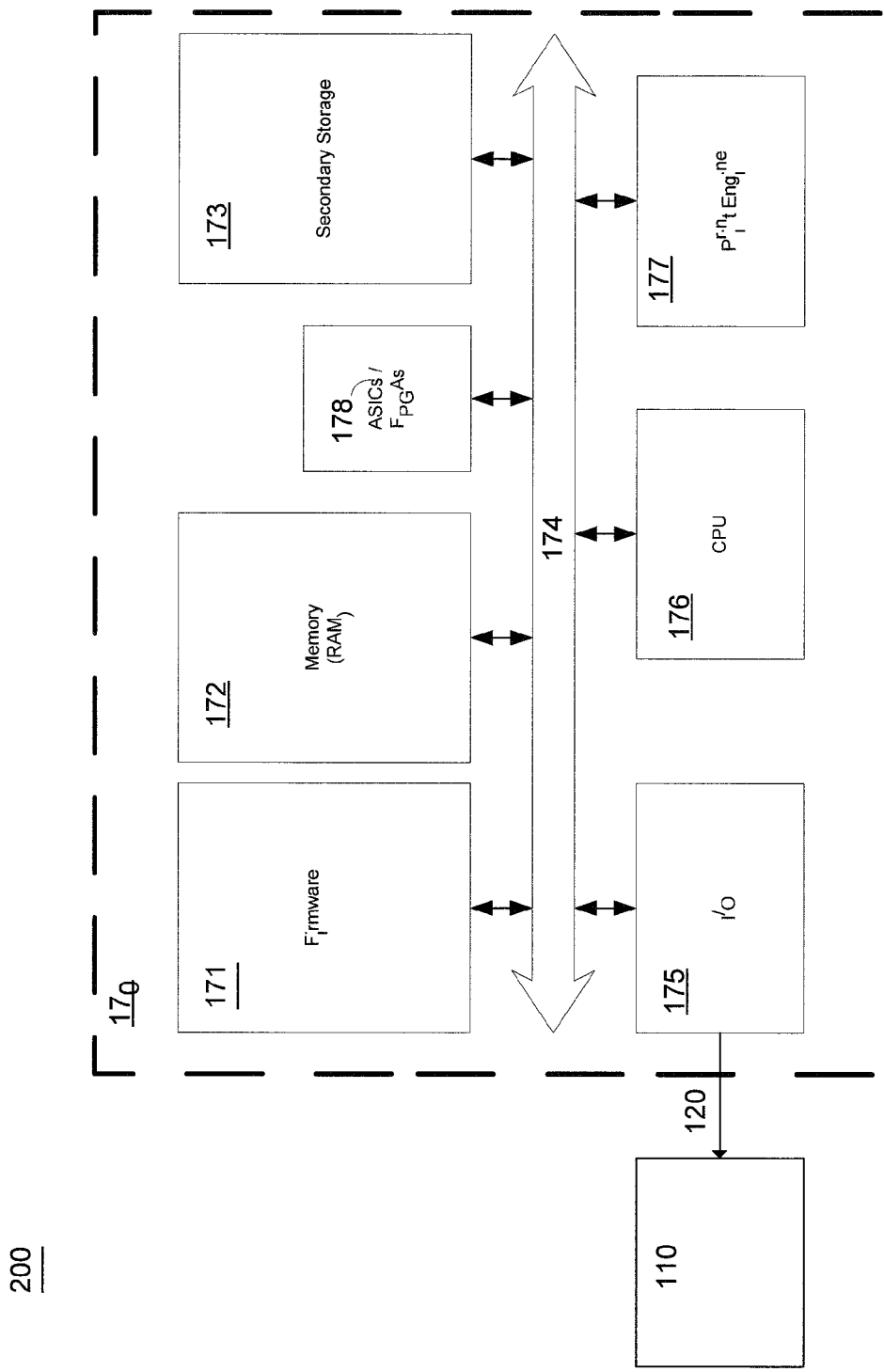
FIG. 2 shows a high-level block diagram of an exemplary printer.

FIG. 2 shows a high-level block diagram 200 of exemplary printer 170. In some embodiments, printer 170 may contain bus 174 that couples central processing unit (CPU) 176, firmware 171, memory 172, input-output ports 175, print engine 177, and secondary storage device 173. Printer 170 may also contain other Application Specific Integrated Circuits (ASICs), and/or Field Programmable Gate Arrays (FPGAs) 178 that are capable of executing portions of an application to process PPMLs according to one or more disclosed embodiments. In another embodiment, printer 170 may also be able to access secondary storage or other memory in computing device 110 using I/O ports 175 and connection 120 or network 140. In some embodiments, printer 170 may also be capable of executing software including a printer operating system, software to process packaged print data streams, and other appropriate application software. In some embodiments, printer 170 may allow paper sizes, output trays, color selections, and print resolution, among other options, to be user-configurable.

In some embodiments, CPU 176 may be a general-purpose processor, a special purpose processor, or an embedded processor. CPU 176 can exchange data including control information and instructions with memory 172 and/or firmware 171. Memory 172 may be any type of Dynamic Random Access Memory (DRAM) such as but not limited to SDRAM, or RDRAM. Firmware 171 may hold instructions and data including but not limited to a boot-up sequence, pre-defined routines, and other code. In some embodiments, code and data for processing PPML may reside in firmware 171 may be copied to memory 172 prior to being acted upon by CPU 176.

Routines in firmware 171 may include code to translate PDL or PPML page descriptions received from computing device 110. In some embodiments, firmware 171 may include routines to process PPMLs, including one or more PDLs. Firmware 171 may also include routines to convert display commands in a display list to an appropriate rasterized bit map and store the bit map in memory 172. Firmware 171 may also include compression routines and memory management routines. In some embodiments, data and instructions in firmware 171 may be upgradeable.

In some embodiments, CPU 176 may act upon instructions and data and provide control and data to ASICs/FPGAs 178 and print engine 177 to generate printed documents. In some embodiments, ASICs/FPGAs 178 may also provide control and data to print engine 177. ASICs/FPGAs 178 may also implement one or more of translation, compression, and rasterization algorithms. In some embodiments, computing device 110 can transform document data into a first printable data. Then, the first printable data can be sent to printer 170 for transformation into intermediate printable data. Printer 170 may transform intermediate printable data into a final form of printable data and print according to this final form. In some embodiments, the first printable data may correspond to packaged print data in an OPC package, which can take the form of an XPS package, or a PDL or PPML description of a document.

In some embodiments, the translation process from a PDL or PPML description of a document to the final printable data comprising of a series of lower-level printer-specific commands may include the generation of intermediate printable data comprising of display lists of objects. In some embodiments, display lists may be stored in memory 172 or secondary storage device 173. Exemplary secondary storage device 173 may be an internal or external hard disk, memory stick, or any other memory storage device capable of being used system 200. In some embodiments, the display list may reside in one or more of printer 170, computing device 110, and server 130.

Figure 3:
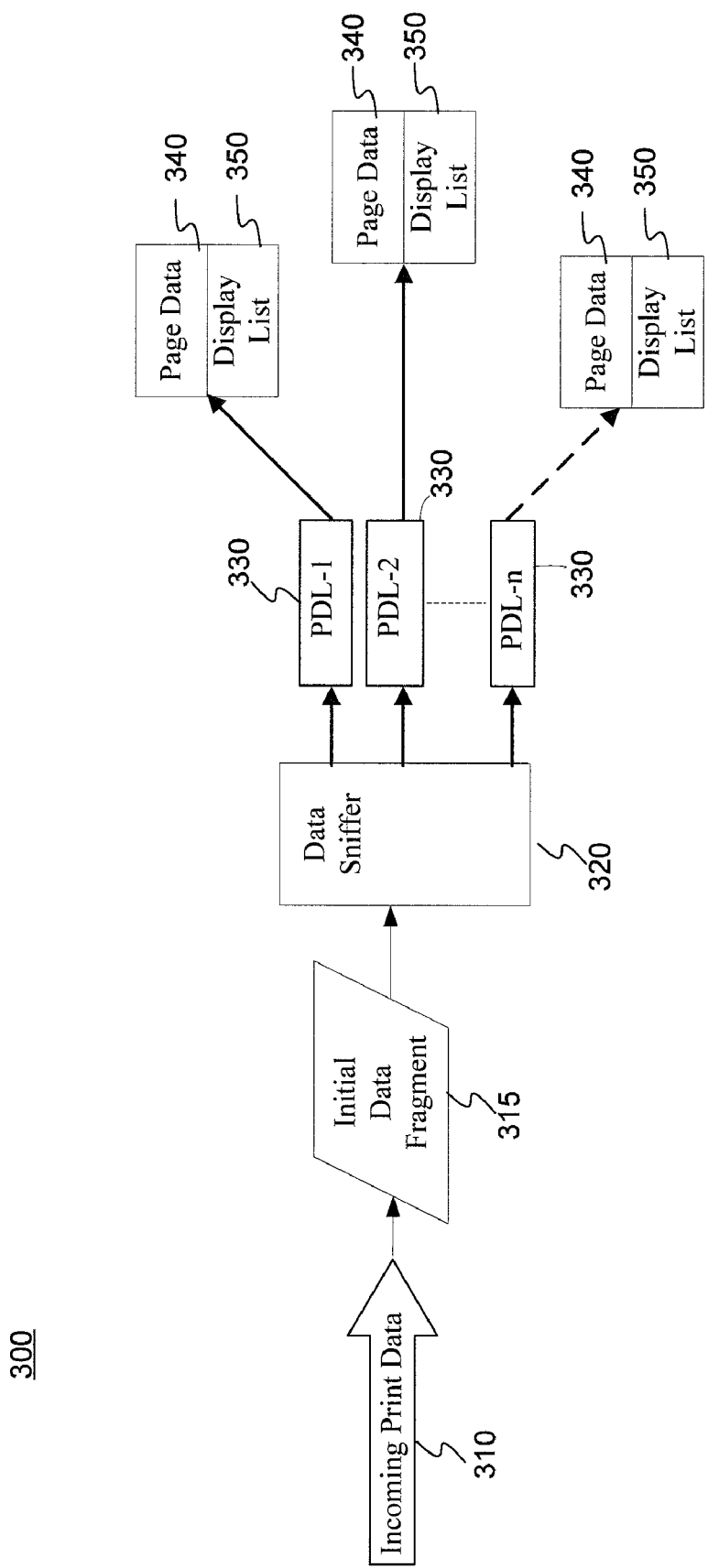
FIG. 3 shows an exemplary high-level architecture of a system for page description processing using a PDL.

FIG. 3 shows a typical exemplary high-level architecture 300 of a system for page description processing using a PDL. Data sniffer 320, which may comprise language selection routines, can be used to determine the PDL used to process a print job with language data 310 that is received for processing at printer 170. For example, data sniffer 320 can inspect data fragment 315, such as header data in the print job to determine the PDL used in the print job. Data sniffer 320 may also determine an entry point for the PDL language processor 330 and can invoke PDL language processor 330 at the appropriate entry point. PDL language processor 330 can process the print job to generate display list 350 and page layout data 340 that are specific to the PDL. Display list 350 can then be rendered to place print marks on a print medium using print engine 177. The processing involved in data sniffer 320 and performed by PDL language processor 330 may be performed using one or more of firmware 171, CPU 176, and/or print engine 177 and may further utilize ASICs/FPGAs 178. Display list 350 may be stored in memory 172 and/or secondary storage device 173. All or portions of the processing involved in data sniffer 320 and performed by PDL language processor 330 may also be implemented within a host controller on computing device 110.

Figure 4A:
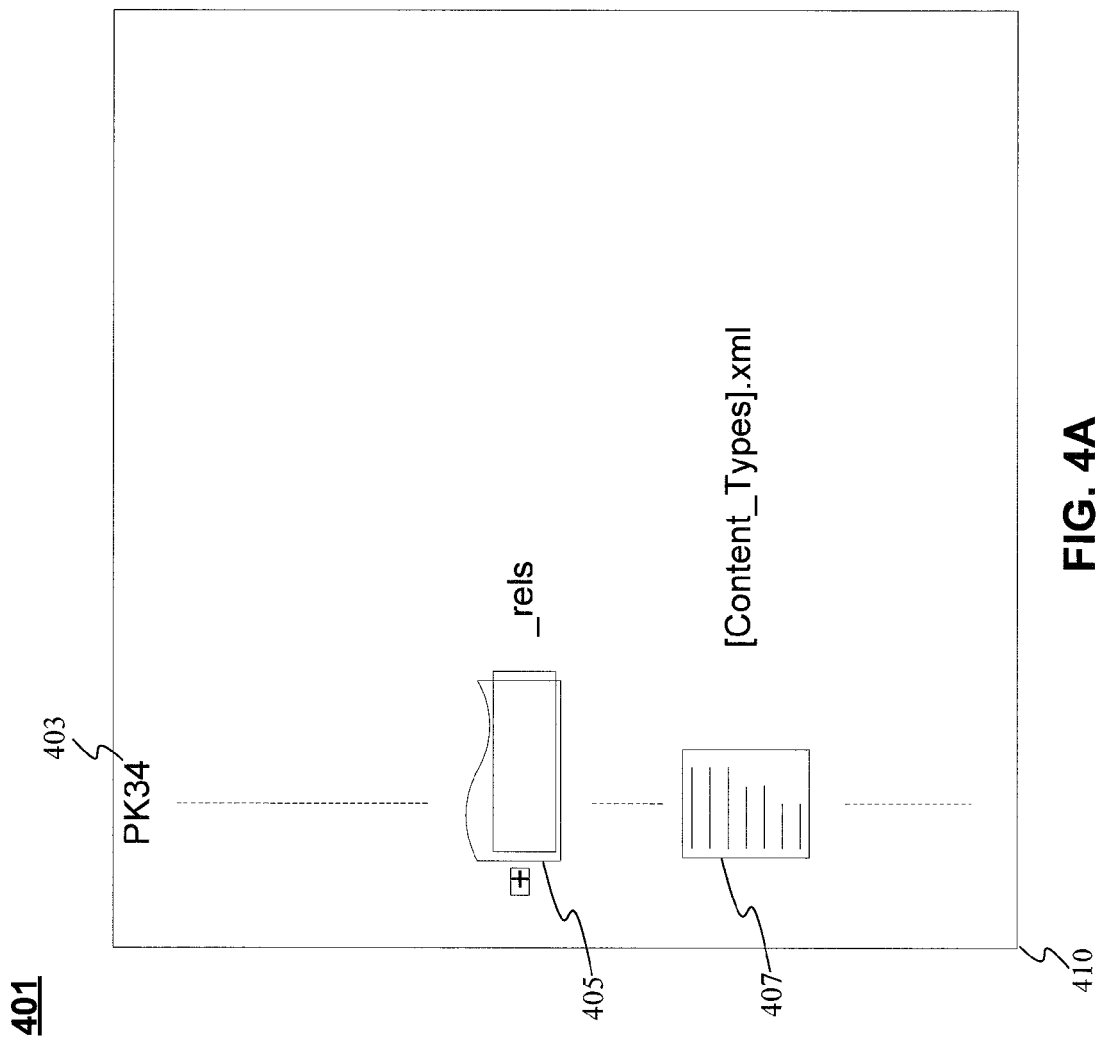
FIG. 4A shows an exemplary structure of an OPC package along with some exemplary package components.

FIG. 4A shows an exemplary structure 401 of an OPC package 410 along with some exemplary package components. As shown in FIG. 4A, exemplary OPC package 410, which is typically in a ZIP format, can include a number of files and folders. Text string 403 may consist of the two ASCII characters "P" and "K," followed by the numerical values 3 and 4. In other words, the hexadecimal sequence x50x43x03x04, at the start of OPC package 410 may indicate that the file uses the ZIP format. As used in this disclosure, the term text string denotes a string comprised of some combination of characters, which can include alphanumeric characters, various other special characters, and symbols. Exemplary OPC package 410 also includes root "_rels" folder 405 and "[Content_Types].xml" file (hereinafter referred to as "Content Types file") 407. Content Types file 407 includes a Content Types list that can be used to correlate file extensions within the package with their corresponding file types. Root _rels folder 407 can contain XML data, which indicates how the files in the package relate to each other. Root level _rels folder 407 specifies relationships for the OPC package 410 as a whole. The _rels folder includes a part called ".rels", which may used to determine package relationships.

Figure 4B:
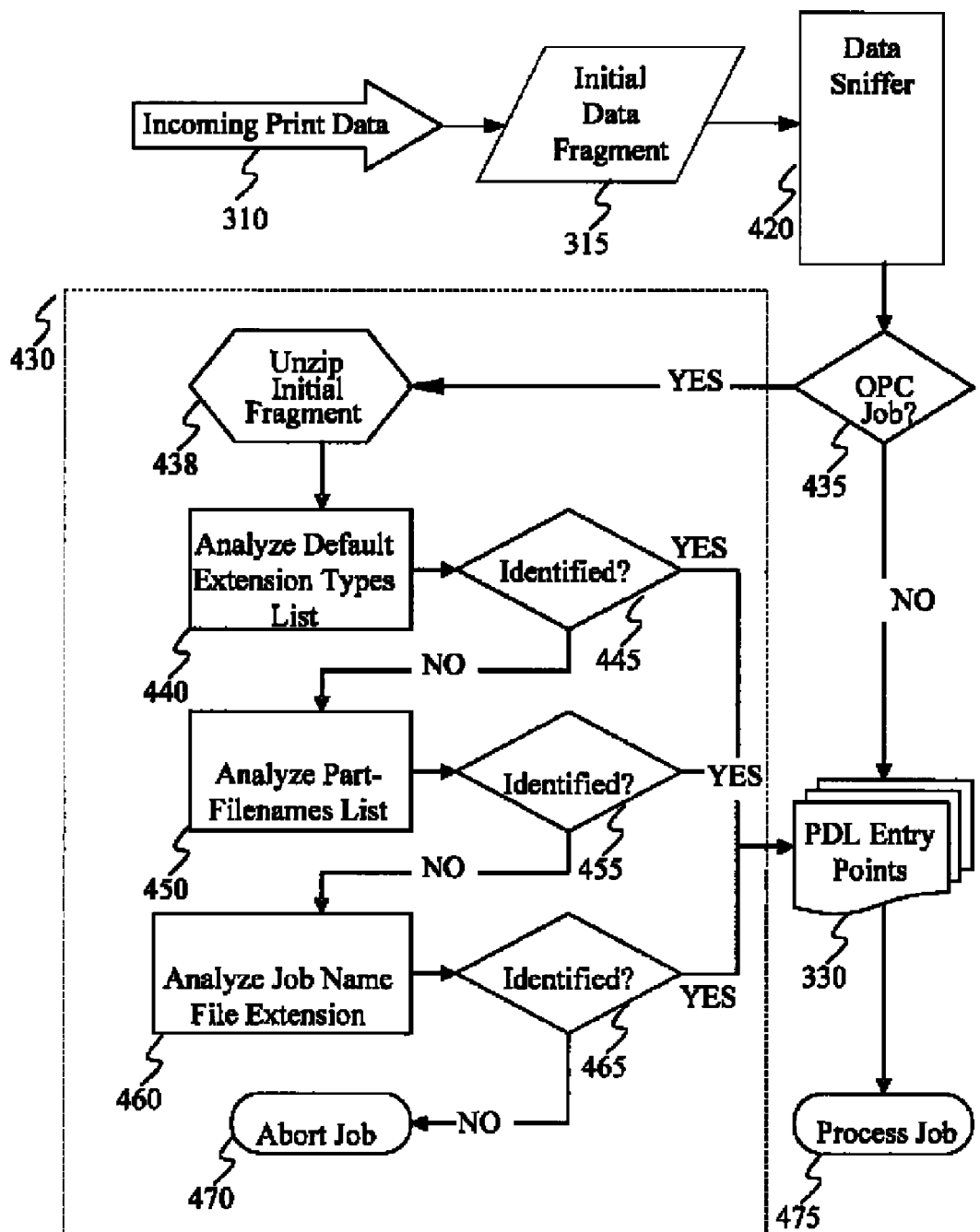
FIG. 4B shows an exemplary process flow illustrating an algorithm 400 for packaged print data processing.

FIG. 4B shows an exemplary process flow illustrating an algorithm 400 for packaged print data processing. In some embodiments, algorithm 400 may be implemented as modification, upgrade, and/or patch to existing print data processing algorithms on printer 170. In some embodiments, algorithm 400 may be implemented in firmware 171 and/or ASICs/FPGAs 178 and operate under the control of CPU 176. For example, program code residing in secondary storage 173 and firmware 171 may be copied to main memory 172 and be acted upon by CPU 176, which may offload one or more tasks to ASICs/FPGAs 178. In general, algorithm 400 may be implemented by some combination of hardware, software, and/or firmware.

As shown in FIG. 4B, incoming print data 310 from a print job may be received for processing. In some embodiments, the job may be packaged. For example, the Open Packaging Conventions ("OPC") (primarily specified in part 2 of ECMA 376—the Office Open XML standard) describe a method for packaging various types of printable data into a standard format. Similarly, the XML Paper Specification ("XPS"), which also utilizes the OPC convention, may also be used to specify the format for packaged print jobs.

The Open Packaging Convention permits data of various formats to be stored in a single package, which may be in the ZIP format. As described above in FIG. 4A, the OPC package comprises two components that include metadata in the form of an XML "Content Types" file and a folder called "_rels", which contains XML data indicating how the files relate to each other. The Content Types file includes a Content Types list that can be used to correlate file extensions within the package with their corresponding file types. By using the Content Types list and "_rels" folder, the types of files in the package and their relationships to each other may be determined.

FIG. 5 shows two exemplary Content Types files 500 for XPS and OOXML. As shown in FIG. 5, exemplary XPS Content Types file 510 and exemplary OOXML Content Types file 620 include Content Types lists 515 and 525, respectively. Content Types lists 515 and 525 include one or more lines with text strings that associate a "Default Extension" with a "Content Type". The default extension typically specifies a file extension, which is the terminal portion of a file name and is often preceded by a dot ("."). In addition, OOXML Content Types file 620 may include lines specifying an "Override PartName", which may provide further information pertaining to associations between a portion of a file name and a Content Type. As shown in FIG. 5, the structure of exemplary XPS Content Types file 510 and exemplary OOXML Content Types file 620 is similar.

In some embodiments, data sniffer module 420 may parse initial data fragment 315 in the print job to identify the incoming print job file. For example, the initial data fragment may indicate the type of incoming print data 310. For example, the incoming print job may be identified as a ZIP file, or the PDL used in the print job may be determined. ZIP files typically contain a particular sequence of four bytes at the start of the file. These bytes are the two ASCII characters "P" and "K," followed by the numerical values 3 and 4. Accordingly, in some embodiments, data sniffer 420 may use the presence of the ASCII characters "PK," (whose ASCII values are represented as x50 and x43 in hexadecimal), followed by the binary values of the numbers 3 and 4 (represented as x03 and x04 in hexadecimal) to identify a print job as a packaged ZIP file. In other words, the hexadecimal sequence x50x43x03x04, at the start of a file may indicate that the file uses the ZIP format. Note that because Personal Printer Markup Language ("PPML") files may also use the ZIP format, identification of a package as being in the ZIP format may not establish a package as an OPC package and further analysis may be performed.

In some embodiments, if a file corresponding to a print job is determined to lack x50x43x03x04 byte sequence, then data sniffer module 420 may determine that the print job has been specified using a PDL such as PostScript, PCL, PDF, etc. based on the results of the analysis of initial data fragment 315. The various PDL languages can be differentiated from each other using the standard sniffing procedures, which may already be available on printer 172. Accordingly, in step 435, if the file is not an OPC job ("NO" in step 435) then a PDL language processor for the pint job may be invoked at an appropriate language entry point in step 330. For example, data sniffer 320 running on printer 170 may operate on the print job received by I/O unit 175 to determine an entry point and invoke the appropriate PDL language processor 330.

Data sniffer module 420 may further analyze ZIP formatted data fragments to determine if the incoming ZIP file is an OPC or a non-OPC file. The algorithm may inspect the fragment to verify the existence of the Content Types file component of the OPC package. In step 435, if the Content Types file exists and the type of job can be determined ("Yes" in step 435) then the job is flagged as an OPC job. In some embodiments, data sniffer 420 may indicate that the incoming data is an OPC packaged ZIP file to downstream modules. Accordingly, if the file is an OPC job ("YES" in step 435) then the initial data fragment may be unzipped, in step 438, for further analysis. Unzipping the initial data fragment may be performed by one of various well-known unzipping algorithms.

The unzipped data fragment may be further analyzed by inspecting the Content Types list. In step 440, the algorithm may inspect the unzipped fragment to analyze the default extension types in the Content Types list (within the Content Types file in the OPC package). In step 445, if the encoding of the print job file i.e. the type of job can be determined from analysis of the default extension types in the Content Types list ("Yes" in step 445) then an appropriate PDL language processor for the print job may be invoked at an appropriate language entry point in step 330. Otherwise, ("NO" in step 445) the algorithm proceeds to step 450.

In step 450, the algorithm may inspect the Content Types list for a list of available part-filenames within the package. In step 455, if the encoding of the print job file or job-type can be determined from the list of file types corresponding to the part-filenames list ("Yes" in step 455) then a PDL language processor for the print job may be invoked at an appropriate language entry point in step 330. Otherwise, ("NO" in step 455) the algorithm proceeds to step 460.

In step 450, the algorithm may inspect the file extension of the print job file name to determine package contents. For example, various extensions may be associated with different PDL types. In step 465, if the encoding of the print job file or job-type can be determined from the print job filename extension ("Yes" in step 455) then a PDL language processor for the print job may be invoked at an appropriate language entry point in step 330. Otherwise, ("NO" in step 465) the algorithm proceeds to step 470, where the print job may be aborted and an error message may be displayed or an exception handler may be invoked.

After the language processor for the PDL has been invoked at an appropriate entry point in step 330, the job may be processed in step 475 using existing algorithms for processing PDLs. One or more steps outlined in FIG. 3 may used to process PDLs. For example, page layout data 340 specific to PDL may be determined and set by PDL language processor 330. After PDL language processor 330 has been called, a display list 350 or any other intermediate form of print data specific to PDL may be created and populated with appropriate objects. The display list 350 may then be rasterized and the page may be rendered. For example, objects in the display list 350 may be rendered into a frame buffer, which may reside in memory 172.

If the print job has completed, the algorithm may move to a "wait state", where it waits for the next incoming job. For example, a print job may be marked as complete when all print instructions have been processed and pages rendered, the print job is complete, and in step 495 the controller may exit PDL language processor 330. If the print job is not complete, the algorithm may return to step 450 and iterate through the subsequent steps until the processing of the print job has been completed. In some embodiments, steps 438 through 470 may be implemented as OPC sniffer module 430. In some embodiments, high-level architecture 300 may be augmented by the addition of OPC sniffer module 430 with other appropriate modifications as would be apparent to one of ordinary skill in the art.

FIG. 6 shows a table 600 that correlates text strings in the Content Types list with PDLs. The Content Types list is present within the Content Types file in an OPC package. Table 600 may be used to identify a PDL that corresponds to a text string in the Content Types list. Although the file structures can be very similar between the XPS and OOXML files, identification of the format of print job files may be performed by examining individual lines of the Content Types list. The listed types can be used to determine the actual format of the document itself.

In one implementation, a table can be used to correlate particular text strings, which occur in the print job filename, to an identifier for a given language. Each line of the Content Types list may be scanned for the text string, which may then be matched with a text string in column 1 of exemplary table 600. When the text string is encountered in table 600, the corresponding language identifier or language enumeration (in column 2) can be used to determine an entry point into the correct language processor. In some embodiments, one or more tables (similar to table 600) may be used in steps 440, 450, and 460 of algorithm 400, to correlate default extension types, part filenames, and job name file extensions with PDL entry points. Content list types and corresponding languages may easily be added or deleted by updating Table 600.

FIG. 7 shows a table 700 that correlates language enumerations with PDL language entry point functions. Once a language enumeration has been identified an appropriate language entry point function can be determined using table 700. As shown in Table 700, language entry point functions _XMLEntry 750, _XPSEntry 760, _TIFFEntry 770, and _JPEGEntry 780, correspond to language enumerations XML (Language_XML) 710, XPS (Language_XPS) 720, TIFF (OPC_TIFF) 730, and JPEG (OPC_JPEG) 740, respectively. Languages and corresponding entry point functions may easily be added or deleted by updating Table 700.

Other embodiments will be apparent to those skilled in the art from consideration of the specification and practice of one or more embodiments disclosed herein. It is intended that the specification and examples be considered as exemplary only, with true scope and spirit being indicated by the following claims.

What is claimed is:

1. A computer-implemented method for processing print data in a print job, the method comprising the computer-implemented steps of:

parsing at least one fragment of the print data to determine if the print data occurs in the form of a print package in a ZIP format;

invoking a first PDL language processor for a first PDL using a language entry point function for the first PDL, wherein the language entry point function is determined using a text string that occurs in the print job filename and a Content Types list, if the print data is packaged in a ZIP format and if the unzipped fragment comprises a Content Types file that includes the Content Types list; and invoking a second PDL language processor for a second PDL at a language entry point for the second PDL, wherein the language entry point is determined using a file extension associated with the print job filename, if the print data is packaged in ZIP format and the first PDL language processor cannot be determined using the Content Types list in the unzipped fragment.

2. The computer-implemented method of claim 1, wherein the Content Types list comprises a default filename extension list and a part filenames list.

3. The computer-implemented method of claim 1, wherein the print package is one of an OPC package or a PPML package.

4. The computer-implemented method of claim 3, wherein the OPC package is one of an XPS package or an OOXML package.

5. The computer-implemented method of claim 1, further comprising invoking a data sniffer to determine a language processor for processing the print data, if the print package does not comprise a Content Types file.

6. The computer-implemented method of claim 1, further comprising aborting the print job, if no PDL language processor can be determined using the Content Types list or the file extension associated with the print job.

7. The computer-implemented method of claim 1, wherein the first and second PDL are mapped to their respective language entry point functions by:

looking-up a first table that correlates the text string with a PDL; and looking-up a second table that correlates the PDL with a language entry point function.

8. The computer-implemented method of claim 7, wherein the first and second look-up tables are updateable.

9. The computer-implemented method of claim 1, wherein the method is performed on:

a computer, or a printer, or at least one computer coupled to at least one printer.

10. A non-transitory computer-readable medium that contains instructions, which when executed by a processor perform steps in a method for processing print data in a print job, the steps comprising:

parsing at least one fragment of the print data to determine if the print data occurs in the form of a print package in a ZIP format;

invoking a first PDL language processor for a first PDL using a language entry point function for the first PDL, wherein the language entry point function is determined using a text string that occurs in the print job filename and a Content Types list, if the print data is packaged in a ZIP format and if the unzipped fragment comprises a Content Types file that includes the Content Types list; and invoking a second PDL language processor for a second PDL at a language entry point for the second PDL, wherein the language entry point is determined using a file extension associated with the print job filename, if the print data is packaged in ZIP format and the first PDL language processor cannot be determined using the Content Types list in the unzipped fragment.

11. The non-transitory computer-readable medium of claim 10, wherein the Content Types list comprises a default filename extension list and a part filenames list.

12. The non-transitory computer-readable medium of claim 10, wherein the print package is one of an OPC package or a PPML package.

13. The non-transitory computer-readable medium of claim 12, wherein the OPC package is one of an XPS package or an OOXML package.

14. The non-transitory computer-readable medium of claim 10, further comprising invoking a data sniffer to determine a language processor for processing the print data, if the print package does not comprise a Content Types file.

15. The non-transitory computer-readable medium of claim 10, further comprising aborting the print job, if no PDL language processor can be determined using the Content Types list or the file extension associated with the print job.

16. The non-transitory computer-readable medium of claim 10, wherein the first and second PDL are mapped to their respective language entry point functions by:

looking-up a first table that correlates the text string with a PDL; and looking-up a second table that correlates the PDL with a language entry point function.

17. The non-transitory computer-readable medium of claim 16, wherein the first and second look-up tables are updateable.

18. A system for processing Personalized Print Markup Language (PPML) print data for at least one document page, comprising:

an input interface configured to receive print data;

a memory configured to store the print data; and a processor coupled to the input interface and the memory, wherein the processor is configured to execute instructions in the memory to perform the steps of:

parsing at least one fragment of the print data to determine if the print data occurs in the form of a print package in a ZIP format;

invoking a language processor for a first PDL using a language entry point function for the first PDL, wherein the language entry point function is determined using a text string in a Content Types file associated with the package, if the print data is packaged in a ZIP format and the unzipped fragment comprises a Content Types list; and invoking a language processor for a second PDL at a language entry point for the second PDL, wherein the language entry point is determined using a file extension associated with the print job, if the print data is packaged in ZIP format and the PDL language processor cannot be determined using the Content Types list in the unzipped fragment.

19. The system of claim 18, wherein the Content Types list comprises a default filename extension list and a part filenames list.

20. The system of claim 18, wherein the print package is one of an OPC package or a PPML package.

21. The system of claim 20, wherein the OPC package is one of an XPS package or an OOXML package.

* * * * *